United States Patent
Smith et al.

(10) Patent No.: US 8,060,876 B2
(45) Date of Patent: Nov. 15, 2011

(54) METHODS AND APPARATUS FOR CREATING AN ISOLATED PARTITION FOR A VIRTUAL TRUSTED PLATFORM MODULE

(75) Inventors: Ned M. Smith, Beaverton, OR (US); Willard M. (Monty) Wiseman, Tigard, OR (US); Faraz A. Siddiqi, Portland, OR (US); Tasneem Brutch, Cornelius, OR (US); Vincent R. Scarlata, Beaverton, OR (US); Alok Kumar, Santa Clara, CA (US); Kalpana M. Roge, Cumming, GA (US); Murari Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1041 days.

(21) Appl. No.: 11/837,378

(22) Filed: Aug. 10, 2007

(65) Prior Publication Data

US 2009/0044187 A1    Feb. 12, 2009

(51) Int. Cl.
*G06F 9/455* (2006.01)
*G06F 9/46* (2006.01)

(52) U.S. Cl. ............................. 718/1; 718/100
(58) Field of Classification Search .................. None
See application file for complete search history.

(56) References Cited

U.S. PATENT DOCUMENTS

| | | | |
|---|---|---|---|
| 7,076,655 B2 | 7/2006 | Griffin et al. | |
| 7,222,062 B2 | 5/2007 | Goud et al. | |
| 7,380,119 B2 | 5/2008 | Bade et al. | |
| 2002/0194482 A1 | 12/2002 | Griffin et al. | |
| 2003/0115453 A1 | 6/2003 | Grawrock | |
| 2004/0264797 A1 | 12/2004 | Lippincott et al. | |
| 2005/0132122 A1 | 6/2005 | Rozas | |
| 2005/0286792 A1 | 12/2005 | Mehta et al. | |
| 2006/0002471 A1 | 1/2006 | Lippincott et al. | |
| 2006/0020781 A1 | 1/2006 | Scarlata et al. | |
| 2006/0140501 A1 | 6/2006 | Tadas | |
| 2007/0043896 A1 | 2/2007 | Daruwala et al. | |

FOREIGN PATENT DOCUMENTS

WO    WO 02/06929 A2    1/2002

OTHER PUBLICATIONS

M. Ramachandran et al., "New Client Virtualization Usage Models Using Intel® Virtualization Technology," Intel® Technology Journal, Aug. 10, 2006, vol. 10, Issue 3, pp. 206-216.
Nancy Sumrall, et al., Trusted Computing Group (TCG) and the TPM 1.2 Specification, Intel Developer Forum, pp. 1-32.
Charles Scott Powell, Foundations for Trusted Computing, Net Project, Nov. 7, 2002, London, England, pp. 1-87.

(Continued)

*Primary Examiner* — Emerson Puente
*Assistant Examiner* — Camquy Truong
(74) *Attorney, Agent, or Firm* — Trop, Pruner & Hu, P.C.

(57) ABSTRACT

A data processing system isolates a virtual trusted platform module (vTPM) manager in the processing system from other management software in the processing system. In one example process, the processing system launches a virtual machine monitor (VMM) that includes a memory-mapped input/output (MMIO) trap. The processing system also launches a vTPM manager in a first virtual machine (VM). In addition, the processing system launches a second VM to contain virtual machine management programs other than the vTPM manager and the MMIO trap. Other embodiments are described and claimed.

11 Claims, 2 Drawing Sheets

OTHER PUBLICATIONS

"Trusted Computing Platform Alliance (TCPA) Main Specification Version 1.1b", Trusted Computing Group, Inc. 2003, pp. 1-332.

"TPM Main Part 1 Design Principles, Specification Version 1.2 Revision 62", Trusted Computing Group, Oct. 2, 2003, pp. 1-161.

Mario Strasser, "A Software-Based TPM Emulator for Linux", *Semester Thesis, Department of Computer Science*, Jul. 2004. pp. 1-56, Zurich, Switzerland.

Tal Garfinkle, et al. "Terra: A Virtual Machine-Based Platform for Trusted Computing", Computer Science Department, Stanford University, Oct. 19, 2003, pp. 1-14.

PCT International Search Report for Application No. PCT/US2005/019724, filed Jun. 3, 2005, mailed Sep. 5, 2005.

Vincent Scarlata, Method and Apparatus for Remotely Provisioning Software-Based Security Coprocessors, U.S. Appl. No. 11/171,880, filed Jun. 29, 2005.

Vincent Scarlata, Method and Apparatus for Generating Endorsement Credentials for Software-Based Security Coprocessors, U.S. Appl. No. 11/171,856, filed Jun. 29, 2005.

Vincent Scarlata, Method and Apparatus for Providing Software-Based Security Coprocessors, U.S. Appl. No. 11/171,131, filed Jun. 29, 2005.

"What is Trusted Grub?", Applied Data Security Group, prosec.rub.de/trusted_grub.html.

VMware Inc., "VMware Reinvents Enterprise Desktop Management and Security with Breakthrough New Product", Sep. 20, 2004, wmware.com/new/release/ace_announce.html.

Barham et al., "Xen and the Art of Virtualization", University of Cambridge Computer Laboratory, pp. 14, 2003. Last accessed Jan. 29, 2008, cl.cam.ac.uk/Research/SRG/netos/papers/2003-xensosp.pdf.

George W. Dunlap, et al. "ReVirt: Enabling Intrusion Analysis through Virtual-Machine Logging and Replay", Proceedings of the 2002 Symposium on Operating Systems Design and Implementation, pp. 1-14, eecs.umich.edu/CoVirt/papers/revirt.pdf.

Joan G. Dyer et al., "Building the IBM 4758 Secure Processor", Oct. 2001, pp. 1-10, //ieeexplore.org/iel5/20660/00955100.pdf?arnumber=955100.

Fraser et al., "Safe Hardware Access with the Xen Virtual Machine Monitor", University of Cambridge Computer Laboratory, pp. 10. Last accessed Jan. 29, 2008, cl.cam.ac.uk/Research/SRG/netos/papers/2004-oasis-ngio.pdf.

Garfinkle et al., "TERRA: A Virtual Machine-Based Platform for Trusted Computing", (presentation), Nov. 10, 2004, pp. 23. Last accessed on Jan. 29, 2008, cs.utexas.edu/~shmat/courses/cs395t_fall04/rager.pdf.

The Trusted Computing Group, "What is the Trusted Computing Group?" (Internet home page) 2005, trustedcomputinggroup.org/home.

John Marchensini, et al., "Experimenting with TCPA/TCG Hardware", Computer Science Technical Report TR2003-476, Dec. 15, 2003, pp. 1-20, cs.dartmouth.edu/~sws/papers/mswm03.pdf.

Meushaw et al., "NetTop: Commercial Technology in High Assurance Applications", Tech Trend Notes, vol. 9, ed. 4, Research and Advanced Technology Publication, Fall 2000, pp. 9. Last accessed on Jan. 29, 2008, vmware.com/pdf/TechTrendNotes.pdf.

David Afford "The Need for TCPA", IBM Research, Oct. 2002, pp. 8. Last Accessed Jan. 29, 2008, research.ibm.com/gsal/tcpa/why_tcpa.pdf.

Sailer et al., "Design and Implementation of a TCG-based Integrity Measurement Architecture", IBM Research Report; IBM Research Division, New York, pp. 1-17. Last Accessed on Feb. 7, 2008, ece.cmu.edu/~adrian/630-f04/readings/sailer-zhang-jaeger-doorn-2004.pdf.

Michael, M. Swift et al., "Improving the Reliability of Commodity Operating Systems", Department of Computer Science and Engineering, University of Washington, Oct. 2003, pp. 1-16, cs.rochester.edu/sosp2003/papers/p116-swift.pdf.

Vincent Scarlata, Method And Apparatus For Migrating Software-Based Security Coprocessors, U.S. Appl. No. 11/171,134, filed Jun. 29, 2007.

Stefan Berger et al., "vTPM: Virtualizing the Trusted Platform Module"; Security '06: 15th USENIX Security Symposium, IBM T.J. Watson Research Center, Hawthorne, NY USENIX Association, pp. 305-320.

Sadeghi et al., "Property-based Attestation for Computing Platforms: Caring about properties, not mechanisms", Available from delivery.acm.org/10.1145/1070000/1066038/p67-sadeghi.pdf?key1=1066038&key2=4269876511&coll=&dl=ACM&CFID=15151515&CFTOKEN=6184618.

Rozas, et al., Dynamic Measurement Of An Operating System In A Virtualized System, U.S. Appl. No. 11/513,963, filed Aug. 31, 2006.

N. Petroni et al., "Copilot—a Coprocessor-based Kernel Runtime Integrity Monitor" (usenix.org/publications/library/proceedings/sec04/etch/full_papers/petroni/petroni.pdf) Proceedings of the 13th USENIX Security Symposium, Aug. 9-13, 2004.

David Grawrock, The Intel Safer Computing Initiative: Building Blocks for Trusted Computing, Intel Press, Jan. 2006.

Intel Trusted Execution Technology: Preliminary Architecture Specification, Intel Corp., Nov. 2006.

Mechanisms to Control Access to Cryptographic Keys and to Attest to the Approved Configurations of Computer Platforms, U.S. Appl. No. 11/511,773, filed Aug. 29, 2006.

David W. Grawrock, Platform Configuration Register Virtualization Apparatus, Systems, And Methods, U.S. Appl. No. 11/095,034, filed Mar. 31, 2004.

METHODS AND APPARATUS FOR CREATING AN ISOLATED PARTITION FOR A VIRTUAL TRUSTED PLATFORM MODULE

FIELD OF THE INVENTION

The present disclosure relates generally to the field of data processing, and more particularly to methods and related apparatus for creating an isolated partition for a virtual trusted platform module (vTPM).

BACKGROUND

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may include a root OS, or it may run on top of a root OS. A root OS may also be referred to as a host OS. The VMM may create one or more virtual machines (VMs), and the VMs may boot to different guest OSs or to different instances of the same guest OS. The VMM may thus allow multiple OSs and applications to run in independent partitions.

The CPU in such a data processing system may provide hardware support (e.g., instructions and data structures) for virtualization. Additional details about virtualization may be found in reference manuals such as the following:

Intel® Virtualization Technology Specification for the IA-32 Intel® Architecture, dated April 2005 (hereinafter "the VT-x Specification"); and IA-32 Intel® Architecture Software Developer's Manual, Volume 2B: Instruction Set Reference, N-Z, dated June 2006.

Other manufacturers may produce processors with different features for supporting virtualization. A processing system may also include features referred to as LaGrande Technology (LT), as developed by Intel Corporation. The LT features may provide for the protected measurement and launching of a VMM. Additional details concerning LT are provided in the publication entitled "The Intel Safer Computing Initiative: Building Blocks for Trusted Computing," For purposes of this disclosure, LaGrande Technology may also be referred to as Intel® Trusted Execution Technology (TXT). Additional details concerning Intel® TXT are provided in the publication entitled "Intel® Trusted Execution Technology: Preliminary Architecture Specification" and dated November 2006 (the "Intel® TXT Specification").

In addition to RAM and one or more CPUs, a processing system may include a security coprocessor, such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the runtime configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG In general, a TCG-compliant TPM provides security services such as attesting to the identity and/or integrity of the platform, based on characteristics of the platform. For instance, trusted computing technologies may provide facilities for measuring, recording, and reporting the software configuration of a platform. For instance, the measurements may include load-time measurements of software.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

Figure 1:
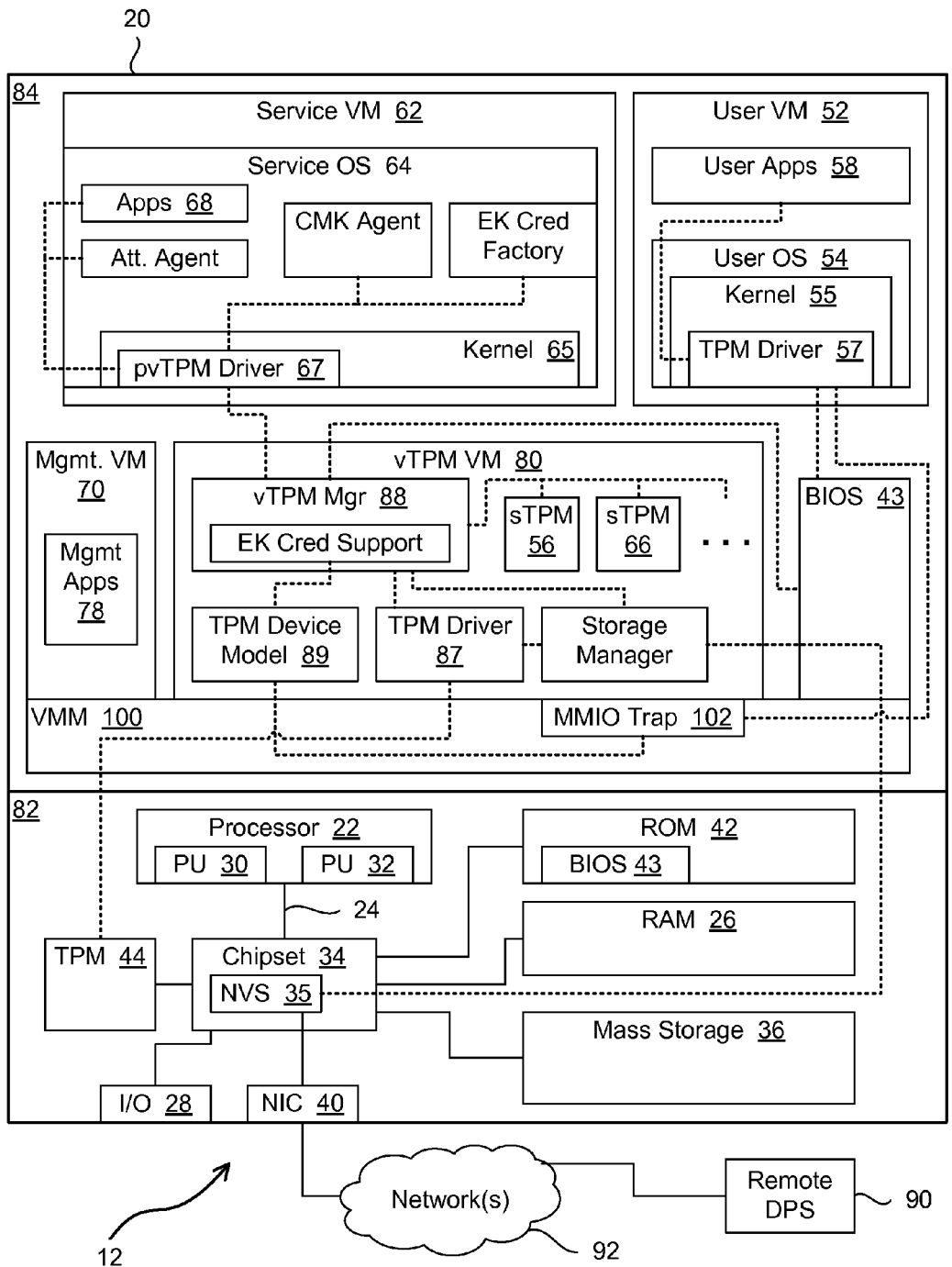
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as a CPU 22 and various other components, which may be communicatively coupled via one or more system buses 24 or other communication pathways or mediums.

This disclosure uses the term "bus" to refer to shared communication pathways, as well as point-to-point pathways. CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

In the embodiment of FIG. 1, processor 22 is communicatively coupled to one or more volatile or non-volatile data storage devices, such as RAM 26, ROM 42, mass storage devices 36 such as hard drives, and/or other devices or media, such as floppy disks, optical storage, tapes, flash memory, memory sticks, digital video disks, etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports 28, input devices, output devices such as a display, etc. A chipset 34 in processing system 20 may serve to interconnect various hardware components. Chipset 34 may include one or more bridges and/or hubs, as well as other logic and storage components. In the example embodiment, processor 22 is communicatively coupled to a security processor such as TPM 44 via chipset 34.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 90, such as through a network interface controller (NIC) 40, a modem, or other communication ports or couplings. Processing systems may be interconnected by way of a physical and/or logical network 92, such as a local area network (LAN), a wide area network (WAN), an intranet, the Internet, etc. Communications involving network 92 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Some components may be implemented as adapter cards with interfaces (e.g., a PCI connector) for communicating with a bus. In some embodiments, one or more devices may be implemented as embedded controllers, using components such as programmable or non-programmable logic devices or arrays, application-specific integrated circuits (ASICs), embedded processors, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. The software environment 84 may include BIOS components, system management mode (SMM) components, OS components, VMM components, user applications, etc.

Processing systems may include embedded information technology (EIT) that supports system management. For instance, an EIT platform may support verified boot using Intel® TXT and capabilities of a TPM. In addition, a virtual machine (VM) in the platform may make use of core capabilities of a TPM. Such a VM may run a user OS such as Microsoft® Windows Vista™, for example. However, a conventional platform may be unable to share a hardware TPM among multiple VMs while maintaining security guarantees of the TPM.

By contrast, an EIT platform that provides VMs with virtualized TPMs (vTPMs) may be able to maintain security guarantees of the vTPMs and the underlying hardware TPM. One architecture for providing VMs with vTPMs may use a distinct software TPM (sTPM) to hold the context for the vTPM of each VM. In the example embodiment, each partition has an sTPM context in which both temporal and persistent state is managed.

For instance, in processing system 20, a guest VM or user VM 52 may run a user OS 54, and the platform may use an sTPM 56 to maintain context for a vTPM for that VM. As used herein, the term "vTPM" refers to an sTPM for a VM, in conjunction with some or all of the associated control logic for providing TPM services for that VM. User OS 54 may include a kernel 55 with a TPM driver 57. User VM 52 may also include various guest applications 58.

In the example embodiment, processing system 20 also includes a host VM or service VM 62 that runs a service OS 64, such as Linux. Service OS 64 may include an attestation agent, a certifiable migratable key (CMK) agent, an endorsement key (EK) credential factory, and other service applications 68. Service OS 64 may include a kernel 65 with a para-virtualized TPM driver 67. Processing system 20 may use another sTPM 66 to hold the context for a vTPM for service VM 62. Service VM 62 may provide management and security services to support remote management of processing system 20.

Processing system 20 also includes a management VM 70 with various management applications 78 to provide device virtualization. For instance, management applications 78 may handle security configuration, scheduling configuration, and hardware configuration for the other VMs. Thus, the applications in management VM 70 may control which VMs can use NIC 40, which VMs can use various input/output devices, etc. In the example embodiment, management VM 70 has special execution privileges, such as direct access to devices and hardware.

Processing system 20 also has a separate partition, such as vTPM VM 80, for providing vTPMs for other VMs, such as user VM 52 and service VM 62. The term "partition" may be used to refer to an isolated execution environment, a VM, or any similar environment for maintaining separation between operating environments. In the example embodiment, vTPM VM 80 includes a vTPM manager 88 with EK credential support. A TPM driver 87 and a TPM device model 89 may also reside in vTPM VM 80. In addition, vTPM VM 80 may include the sTPMs for other VMs, such as sTPM 56 and sTPM 66, as well as a storage manager for providing storage services. For instance, the storage manager may save persistent state into nonvolatile storage (NVS) 35 in chipset 34. In addition, vTPM manager 88 may apply a cryptographic wrapper to protect the persistent state from tampering.

Processing system 20 also has a VMM 100 with a memory-mapped input/output (MMIO) trap 102. The dashed lines in FIG. 1 illustrate which components communicate with which other components to implement vTPMs. For instance, FIG. 1 has dashed lines between TPM driver 57, MMIO trap 102, TPM device model 89, vTPM manager 88, and sTPM 56. Those dashed lines illustrate that MMIO trap 102 intercepts communications from the TPM drivers and directs them to vTPM VM 80, via TPM device model 89, to be handled with the context from the appropriate sTPM.

Figure 2:
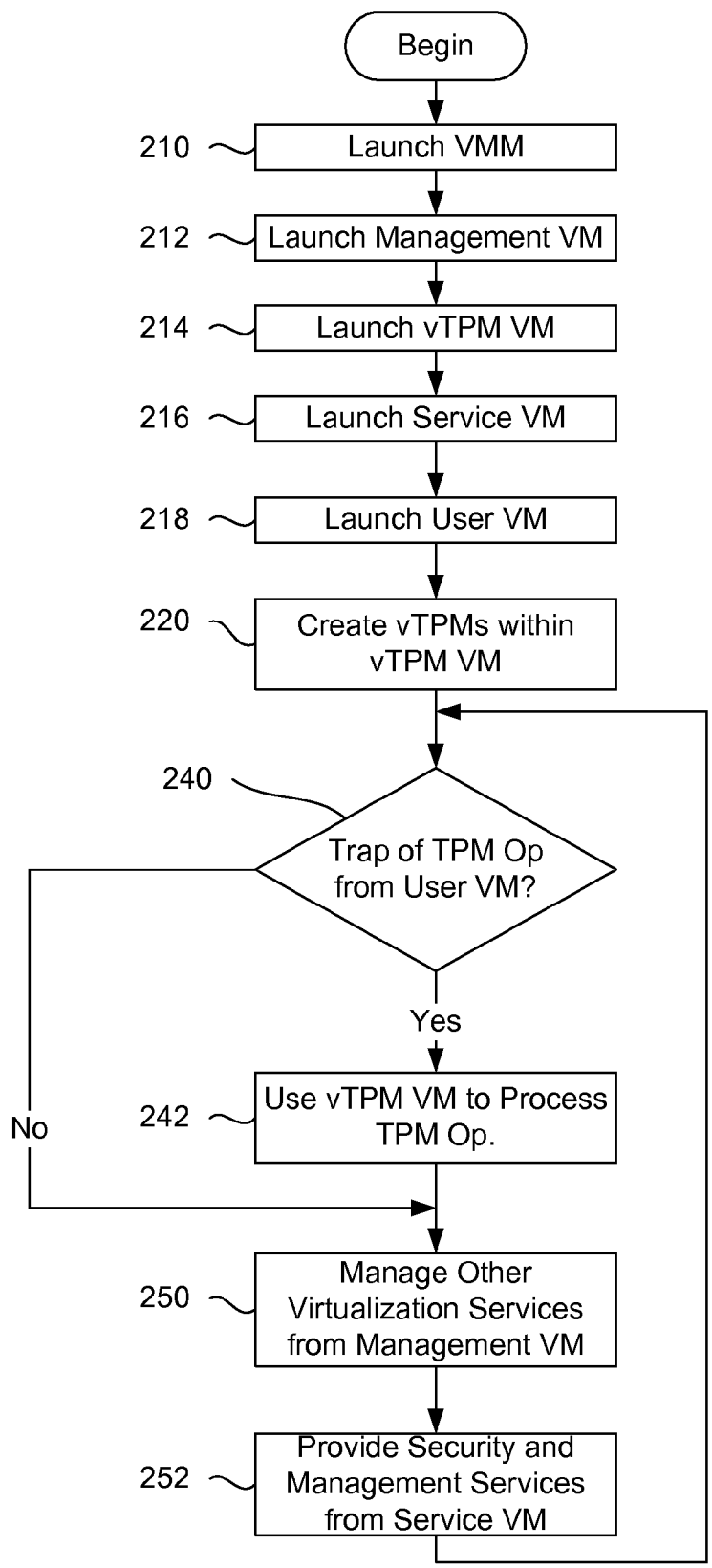
FIG. 2 is a flowchart of a process for creating an isolated partition for a virtual trusted platform module, according to an example embodiment of the present invention.

FIG. 2 is a flowchart of an example process for creating an isolated partition for vTPMs, in the context of the processing system of FIG. 1. The process may begin after processing system 20 has booted BIOS 43. As shown at blocks 210, 212, 214, 216, and 218, processing system 20 may then launch VMM 100, management VM 70, vTPM VM 80, service VM 62, and user VM 52. As depicted in FIG. 1, processing system 20 loads vTPM manager 88 into vTPM VM 80, loads other virtual machine management programs into management VM 70, loads service OS 64 into service VM 62, and loads user OS 54 and user applications 58 into user VM 52.

As shown at block 220, vTPM manager 88 may then create sTPM 56 and sTPM 66 for user VM 52 and service VM 62, respectively, to instantiate vTPMs for user VM 52 and service VM 62. In one embodiment, TPM driver 57 and TPM driver 87 are the same driver, but they are configured to point to different devices or addresses. For instance, TPM driver 57 may point to addresses associated with sTPM 56, while TPM driver 87 may point to addresses associated with hardware TPM 44. In alternative embodiments, the user VMs may use different TPM drivers from the vTPM VM.

VMM 100 and vTPM VM 80 may then cooperate to provide vTPM services for user VM 52 and service VM 62. For example, user applications 58 may access the vTPM for user VM 52 through TPM driver 57. As shown at blocks 240 and 242 (and as described above with regard to the dashed lines in FIG. 1), MMIO trap 102 may intercept communications from TPM driver 57 and direct them to vTPM VM 80, via TPM device model 89. The requested vTPM operation may then be handled by vTPM manager 88 with the context from sTPM 56. If necessary, when processing the requested vTPM operation for user OS 54, vTPM manager 88 may access hardware TPM 44, via TPM driver 87. When service OS 64 executes vTPM operations, processing system 20 may use these same kind of processing steps to process those operations, but instead using sTPM 66.

Service OS applications 68 may also access a fully-virtualized TPM through TPM driver 67. In one embodiment, service OS 64 is not permitted to have complete control of hardware TPM 44 under any circumstances, and neither is any other VM, except for vTPM VM 80. However, to accommodate isolated cases where service OS 64 may need access to hardware TPM capabilities (e.g. for attestation), processing system 20 may allow partial access to hardware TPM 44 from a trusted VM (e.g., service VM 62) by using para-virtualized TPM driver 67. Thus, service OS 64 may use para-virtualized TPM driver 67 to communicate with vTPM for service VM 62, via vTPM manager 88.

Also, as shown at block 250, management applications 78 may provide other types of virtualization services, such as providing for virtualization of NICs, I/O devices, and other devices, other than the TPM. In one embodiment, management VM 70 contains virtual machine management programs other than vTPM manager 88 and MMIO trap 102.

In addition, as shown at block 252, service OS 64 may provide services such as authentication of remote entities, enforcement of security policies, and other functions for supporting remote management of processing system 20. The process may then return to block 240, with processing system 20 continuing to support the various VMs, as appropriate.

In the example embodiment, the entire vTPM subsystem is partitioned in a separate vTPM partition (i.e., vTPM VM 80). This increases the security of the solution, as it separates the control logic and data for the vTPM implementation from several non-vTPM related applications, which run in a separate VM (i.e., management VM 70). In one embodiment, the vTPM partition is a virtual machine with minimal OS or monolithic code. However, the vTPM partition is isolated from management VM 70 and from any other VM (e.g., user VM 52 and service VM 62). The isolation of the vTPM implementation also reduces the available surface of attack on the vTPM itself, and therefore provides additional security.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for isolating a virtual trusted platform module (vTPM) manager in a processing system from other management software in the processing system, the method comprising:

launching a virtual machine monitor (VMM) in the processing system, the VMM to include a memory-mapped input/output (MMIO) trap;

launching a vTPM manager in a first virtual machine (VM) in a processing system;

launching a second VM to contain virtual machine management programs other than the vTPM manager and the MMIO trap; and launching a service operating system (OS) in a third VM in the processing system, launching a user OS in a fourth VM in the processing system, instantiating a first vTPM for use by the service OS of the third VM, instantiating a second vTPM for use by the user OS of the fourth VM, intercepting, by the VMM, an operation of the service OS involving the first vTPM, and using the vTPM manager in the first VM to process the operation of the service OS involving the first vTPM.

2. A method according to claim 1, further comprising:

intercepting, at the MMIO trap in the VMM, information from a native trusted platform module (TPM) driver for the user OS; and in response to intercepting the information from the native TPM driver at the MMIO trap, communicating between the VMM and the vTPM manager.

3. A method according to claim 1, further comprising:

using a trusted platform module (TPM) driver in the first VM for the vTPM manager to communicate with a hardware TPM in the processing system; and using a para-virtualized TPM driver for the service OS to communicate with the first vTPM maintained by the vTPM manager.

4. A method according to claim 1, further comprising performing at least one operation from the group consisting of:

launching one or more additional VMs to contain one or more additional service OSs; and launching one or more additional VMs to contain one or more additional user OSs.

5. An apparatus comprising:

a non-transitory machine-accessible storage medium; and instructions in the non-transitory machine-accessible storage medium, wherein the instructions, when executed by a processing system with a trusted platform module (TPM), cause the processing system to perform operations comprising:

launching a virtual machine monitor (VMM) in the processing system, the VMM to include a memory-mapped input/output (MMIO) trap;

launching a virtual TPM (vTPM) manager in a first virtual machine (VM) in the processing system;

launching a second VM to contain virtual machine management programs other than the vTPM manager and the MMIO trap; and launching a service operating system (OS) in a third VM in the processing system, launching a user OS in a fourth VM in the processing system, instantiating a first vTPM for use by the service OS of the third VM, instantiating a second vTPM for use by the user OS of the fourth VM, intercepting, by the VMM, an operation of the service OS involving the first vTPM, and using the vTPM manager in the first VM to process the operation of the service OS involving the first vTPM.

6. An apparatus according to claim 5, wherein the operations further comprise:

intercepting, at the MMIO trap in the VMM, information from a native TPM driver for the user OS; and in response to intercepting the information from the native TPM driver at the MMIO trap, communicating between the VMM and the vTPM manager.

7. An apparatus according to claim 5, wherein the operations further comprise:

using a TPM driver in the first VM for the vTPM manager to communicate with the TPM; and using a para-virtualized TPM driver for the service OS to communicate with the first vTPM maintained by the vTPM manager.

8. An apparatus according to claim 5, wherein the operations further comprise:

intercepting, by the VMM, an operation of the service OS involving the first vTPM; and using the vTPM manager in the first VM to process the operation of the service OS involving the first vTPM.

9. An apparatus according to claim 5, wherein the operations comprise at least one additional operation from the group consisting of:

launching one or more additional VMs to contain one or more additional service OSs; and launching one or more additional VMs to contain one or more additional user OSs.

10. A processing system comprising:

non-transitory storage;

a trusted platform module (TPM);

a processor in communication with the non-transitory storage and the TPM; and instructions in the non-transitory storage, which, when executed by the processor, cause the processing system to perform operations comprising:

launching a virtual machine monitor (VMM) in the processing system, the VMM to include a memory-mapped input/output (MMIO) trap;

launching a virtual TPM (vTPM) manager in a first virtual machine (VM) in the processing system;

launching a second VM to contain virtual machine management programs other than the vTPM manager and the MMIO trap; and launching a service operating system (OS) in a third VM in the processing system, launching a user OS in a fourth VM in the processing system, instantiating a first vTPM for use by the service OS of the third VM, instantiating a second vTPM for use by the user OS of the fourth VM, intercepting, by the VMM, an operation of the service OS involving the first vTPM, and using the vTPM manager in the first VM to process the operation of the service OS involving the first vTPM.

11. A processing system according to claim 10, wherein the operations further comprise:

intercepting, at the MMIO trap in the VMM, information from a native TPM driver for the user OS; and in response to intercepting the information from the native TPM driver at the MMIO trap, communicating between the VMM and the vTPM manager.

* * * * *